No. 782,096. PATENTED FEB. 7, 1905.
C. T. WRIGHT & G. TOPHAM.
ATTACHMENT FOR TRUNKS.
APPLICATION FILED SEPT. 3, 1903. RENEWED DEC. 31, 1904.
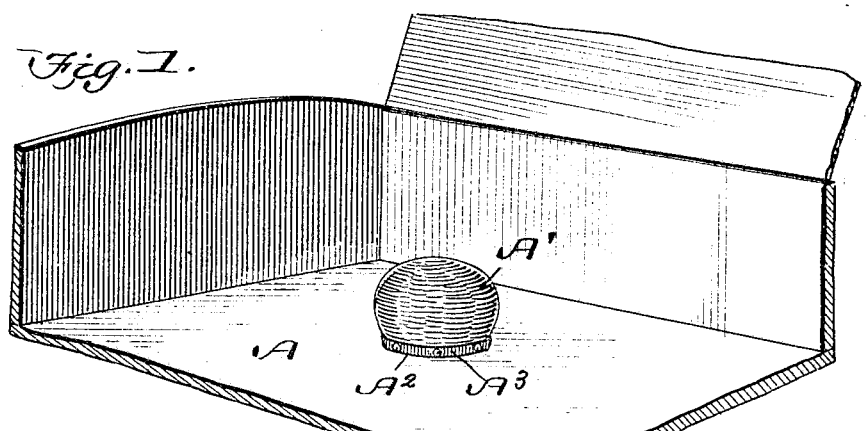
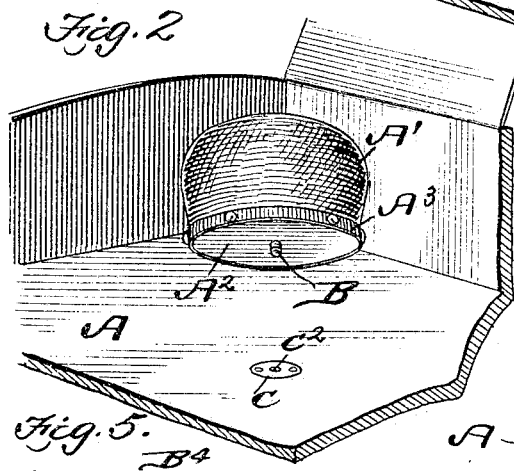
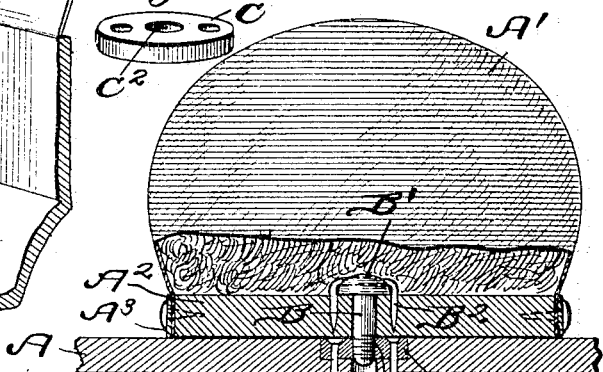
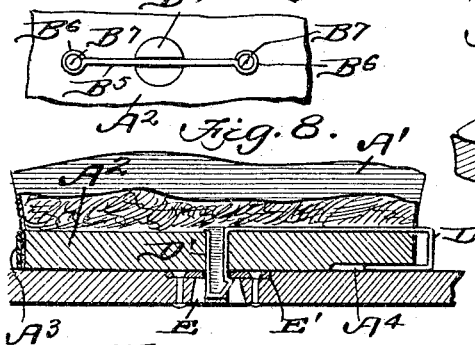
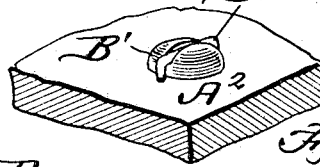
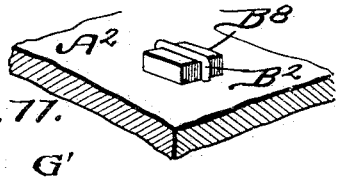
Inventors
G. Topham.
C. T. Wright.

No. 782,096.

Patented February 7, 1905.

UNITED STATES PATENT OFFICE.

CHARLES T. WRIGHT AND GEORGE TOPHAM, OF WASHINGTON, DISTRICT OF COLUMBIA, ASSIGNORS, BY DIRECT AND MESNE ASSIGNMENTS, TO SAID GEORGE TOPHAM, REUBEN A. BOGLEY, JR., AND JAMES S. TOPHAM, OF WASHINGTON, DISTRICT OF COLUMBIA.

ATTACHMENT FOR TRUNKS.

SPECIFICATION forming part of Letters Patent No. 782,096, dated February 7, 1905.

Application filed September 3, 1903. Renewed December 31, 1904. Serial No. 239,236.

*To all whom it may concern:*

Be it known that we, CHARLES T. WRIGHT and GEORGE TOPHAM, citizens of the United States, residing at Washington, in the District of Columbia, have invented a new and useful Attachment for Trunks, of which the following is a specification.

Our invention relates especially to trunk attachments for holding a hat in place in said trunk. It will be understood, however, that while shown and described as attached to the bottom of a trunk our device can be used with other receptacles than trunks, being adapted, for example, for use in show-cases where hats are to be exhibited. Other uses of our invention will appear in the detail description thereof.

Our invention consists in the novel features of construction and combination of parts hereinafter described, particularly pointed out in the claims, and shown in the accompanying drawings, in which—

Figure 1 is a perspective view showing the attachment in place on the bottom of a hat-tray of a trunk. Fig. 2 is a perspective view showing the attachment detached from the bottom of the tray and partly inverted. Fig. 3 is a sectional view through the bottom of the tray and base of the attachment, the upper part of the latter being in elevation and the side of the same being partly broken away. Fig. 4 is a detail perspective view showing our preferred form of locking the screw against rotation relative to the base of the attachment. Figs. 5, 6, and 7 are detail views showing slightly-modified means for locking the screw. Fig. 8 is a detail sectional view showing a slightly-modified form of fastening the base of the attachment to the tray. Fig. 9 is a perspective view of the spring fastening means shown in elevation in Fig. 8. Fig. 10 is a section through the base of the attachment, showing in elevation the means for holding the spring-fastener in place, the section being at right angles to that taken in Fig. 8. Fig. 11 is a section through a portion of the tray-bottom, showing in section the socket for receiving the screws shown in Figs. 2 to 7, inclusive. Fig. 12 is a perspective view of the plate.

Our invention relates especially to the means for securing the hat-holder to the bottom of the tray.

In the drawings, A represents a tray, and A' a substantially semispherical hat-holder formed of hair, excelsior, or other suitable material mounted on a circular base $A^2$ and covering of fabric held in place by a band $A^3$ encircling the periphery of the base and held by suitable tacks or otherwise. The base $A^2$ is centrally perforated, and through this perforation projects downwardly a rounded-end screw B, threaded in its lower portion, smooth in the portion resting in the perforation of the base, and having a rounded slotted head B' bearing downwardly on the upper face of the base. To lock this screw against rotation with reference to the base, we employ a staple $B^2$, the depending ends of which are driven into the base adjacent the ends of the slot in the head B', the intermediate portion of the staple resting in the slot, as is clearly shown in Fig. 4. In Fig. 6 we have shown a screw $B^3$, having a beveled countersunk head $B^4$, the staple $B^2$ resting in the slot in said head. In Fig. 5 we have shown a plan view of the countersunk head $B^4$ and show a wire rod $B^5$, having eyes $B^6$ at each end, held down by staples or wire nails $B^7$, or screws if desired, passed through the eyes. In Fig. 7 we show a screw having a square head $B^8$, over which the staple $B^2$ is arranged, thereby preventing the head from turning with reference to the base $A^2$.

In order to secure the base $A^2$ to the bottom of the tray, we employ as our preferred form a circular plate C, having a central threaded perforation $C^2$. An aperture C' is formed in the bottom of the tray to aline with the threaded perforation when the circular plate is in position, the plate being embedded in the bottom of the tray, so that its upper surface will be flush with the upper surface of the tray. This is deemed important, as it permits the tray to be used for articles other than hats, as when the attachment supported by the base A² is removed the tray is left with a smooth unbroken bottom, which would not be the case if the plate projected above the bottom of the tray.

In Figs. 8, 9, and 10 we have shown a modified form of fastener, and in using this form a rectangular aperture is formed in the base A² and a groove A⁴ is formed in the under side of the base A². A metal spring member D has one end resting in the groove A⁴. This end stops short of the inner end of the groove, and the member extends outward a slight distance from the periphery of the base and is then bent upward and inward and extends along the upper face of the base and at its inner end carries a U-shaped depending member D', the bow portion of which has on one side an outward extension or shoulder D². This member D' extends downwardly through the aperture formed in the base, the shoulder D² lying below the under surface of the base. To receive this lower portion, an opening is formed in the bottom of the tray, as shown at E, and this opening is covered by a plate E', having formed in it an opening of less diameter than that formed in the tray-bottom. The U-shaped member D² extends through the opening in the plate E', and the shoulder D² normally engages the under surface of the plate E and holds the base A² to the tray-bottom. By pressing the outer portion of the spring D inward the shoulder is disengaged from the plate and the base can be detached from the tray-bottom. A supporting and guiding member F extends downward through the aperture in the base A², inclosing the member D' on its open sides, the ends of the member F resting on the base A² and being secured thereto in any suitable manner.

When in position, the hat may be placed in the tray over the rounded holder A' and secured thereto by a hat-pin.

It is understood that any desired means (screws or rivets) can be used in securing the various parts together where such holding means are needed. We have shown the circular plate as held by small rivets or bolts; but screws could be used, if desired. In Fig. 11 we have shown a modified form of plate comprising a plug G having a threaded socket G', the tapering lower end of the plug extending through the bottom of the tray and being headed over a suitable washer.

Having thus fully described our invention, what we claim as new, and desire to secure by Letters Patent, is—

1. The combination with a trunk, a plate having a socket formed therein and set in the wall of a trunk one surface of the said plate lying flush with the surface of the said wall, a hat-holder having a perforated base portion, a fastener adapted to extend through the perforated base of the hat-holder and into the socket of the plate and adapted to engage the said plate, and means for locking the fastener against withdrawal from the base and the socket of the plate.

2. The combination with a trunk, of a plate having a threaded socket embedded in a wall of said trunk, a hat-holder having a perforated base, a screw having a lower threaded portion adapted to engage the socket and an upper smooth portion adapted to rest in the perforation of the plate, a head adapted to bear on the upper side of the base, and means for preventing rotation of the screw with reference to the base.

3. The combination with a trunk, of a plate having a threaded socket embedded in the bottom of said trunk and having its upper surface flush with the upper surface of the trunk-bottom, of a hat-holder having a perforated base, a screw having a slotted head, said screw extending through the perforation of the base and adapted to engage the socket, and means carried by the base adapted to engage the slot of the screw-head and lock the screw against rotation with reference to the base.

4. The combination with a tray having a metal plate, sunk in its bottom and a threaded socket formed in said plate, of a hat-holder comprising a perforated base, a screw having a slotted head said screw extending downward through the perforation and being adapted to engage the socket, and a staple having depending ends adapted to be driven into the base adjacent the ends of the slots, the intermediate portion of said staple being adapted to rest in the slot and prevent rotation of the screw with reference to the base.

CHARLES T. WRIGHT.
GEORGE TOPHAM.

Witnesses:
JAS. G. ADKINS,
E. L. McCLELLAND